(12) United States Patent
Frushour

(10) Patent No.: US 8,741,010 B2
(45) Date of Patent: Jun. 3, 2014

(54) METHOD FOR MAKING LOW STRESS PDC

(76) Inventor: Robert Frushour, Ann Arbor, MI (US)

( * ) Notice: Subject to any disclaimer, the term of this patent is extended or adjusted under 35 U.S.C. 154(b) by 424 days.

(21) Appl. No.: 13/241,877

(22) Filed: Sep. 23, 2011

(65) Prior Publication Data

US 2012/0272582 A1    Nov. 1, 2012

Related U.S. Application Data

(60) Provisional application No. 61/480,069, filed on Apr. 28, 2011.

(51) Int. Cl.
*B24D 18/00*    (2006.01)

(52) U.S. Cl.
USPC .......................................................... 51/307

(58) Field of Classification Search
USPC ..................................... 51/307; 175/428, 434
See application file for complete search history.

(56) References Cited

U.S. PATENT DOCUMENTS

| | | | |
|---|---|---|---|
| 2,238,351 A | 4/1941 | Van Der Pyl |
| 2,941,248 A | 6/1960 | Hall |
| 3,083,080 A | 3/1963 | Bovenkerk |
| 3,134,739 A | 5/1964 | Cannon |
| 3,136,615 A | 6/1964 | Bovenkerk et al. |
| 3,141,746 A | 7/1964 | De Lai |
| 3,233,988 A | 2/1966 | Wentorf, Jr. et al. |
| 3,297,407 A | 1/1967 | Wentorf, Jr. |
| 3,423,177 A | 1/1969 | Bovenkerk |
| 3,574,580 A | 4/1971 | Stromberg et al. |
| 3,745,623 A | 7/1973 | Wentorf, Jr. et al. |
| 4,034,066 A | 7/1977 | Strong et al. |
| 4,042,673 A | 8/1977 | Strong |
| 4,073,380 A | 2/1978 | Strong et al. |
| 4,108,614 A | 8/1978 | Mitchell |
| 4,124,690 A | 11/1978 | Strong et al. |
| 4,151,686 A | 5/1979 | Lee et al. |
| 4,224,380 A | 9/1980 | Bovenkerk et al. |
| 4,247,304 A | 1/1981 | Morelock |
| 4,255,165 A | 3/1981 | Dennis et al. |
| 4,268,276 A | 5/1981 | Bovenkerk |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,412,980 A | 11/1983 | Tsuji et al. |
| 4,481,016 A | 11/1984 | Campbell et al. |

(Continued)

FOREIGN PATENT DOCUMENTS

EP    061954 A1    12/1980
EP    0300699 A2    1/1989

(Continued)

*Primary Examiner* — Pegah Parvini
(74) *Attorney, Agent, or Firm* — Young, Basile, Hanlon & MacFarlane, P.C.

(57) ABSTRACT

A method for making PDC with excellent abrasion resistance at high pressure in a single HPHT step without introducing high residual internal stress. In one aspect of the method, the diamond mass is subjected to an initial high pressure to compact the mass. The initial pressure is then lowered to a second pressure prior to the application of heat to the reaction cell. In another aspect, the diamond mass is subjected to an initial pressure to compact the mass, followed by raising the temperature to melt the sintering aid. The initial pressure is then lowered to a second pressure prior to lowering the temperature below the melting point of the sintering aid.

12 Claims, 1 Drawing Sheet

(56) References Cited

U.S. PATENT DOCUMENTS

| | | |
|---|---|---|
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,407 A | 12/1985 | Fecik et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,707,384 A | 11/1987 | Schachner et al. |
| 4,726,718 A | 2/1988 | Meskin et al. |
| 4,766,040 A | 8/1988 | Hillert et al. |
| 4,776,861 A | 10/1988 | Frushour |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,828,582 A | 5/1989 | Frushour |
| 4,844,185 A | 7/1989 | Newton, Jr. et al. |
| 4,861,350 A | 8/1989 | Phaal et al. |
| 4,871,377 A | 10/1989 | Frushour |
| 4,899,922 A | 2/1990 | Slutz et al. |
| 4,919,220 A | 4/1990 | Fuller et al. |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,027,912 A | 7/1991 | Juergens |
| 5,030,276 A | 7/1991 | Sung et al. |
| 5,092,687 A | 3/1992 | Hall |
| 5,116,568 A | 5/1992 | Sung et al. |
| 5,127,923 A | 7/1992 | Bunting et al. |
| 5,133,332 A | 7/1992 | Tanaka et al. |
| 5,135,061 A | 8/1992 | Newton, Jr. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,236,674 A | 8/1993 | Frushour |
| 5,238,074 A | 8/1993 | Tibbitts et al. |
| 5,244,368 A | 9/1993 | Frushour |
| 5,264,283 A | 11/1993 | Waldenstrom et al. |
| 5,337,844 A | 8/1994 | Tibbitts |
| 5,370,195 A | 12/1994 | Keshavan et al. |
| 5,379,853 A | 1/1995 | Lockwood et al. |
| 5,439,492 A | 8/1995 | Anthony et al. |
| 5,451,430 A | 9/1995 | Anthony et al. |
| 5,464,068 A | 11/1995 | Najafi-Sani |
| 5,468,268 A | 11/1995 | Tank et al. |
| 5,496,638 A | 3/1996 | Waldenstrom et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,607,024 A | 3/1997 | Keith et al. |
| 5,620,382 A | 4/1997 | Cho et al. |
| 5,624,068 A | 4/1997 | Waldenstrom et al. |
| 5,667,028 A | 9/1997 | Truax et al. |
| 5,672,395 A | 9/1997 | Anthony et al. |
| 5,718,948 A | 2/1998 | Ederyd et al. |
| 5,722,499 A | 3/1998 | Nguyen et al. |
| 5,776,615 A | 7/1998 | Wong et al. |
| 5,833,021 A | 11/1998 | Mensa-Wilmot et al. |
| 5,855,996 A | 1/1999 | Corrigan et al. |
| 5,897,942 A | 4/1999 | Karner et al. |
| 5,921,500 A | 7/1999 | Ellis et al. |
| 5,954,147 A | 9/1999 | Overstreet et al. |
| 5,981,057 A | 11/1999 | Collins |
| 6,009,963 A | 1/2000 | Chaves et al. |
| 6,030,595 A | 2/2000 | Sumiya et al. |
| 6,050,354 A | 4/2000 | Pessier et al. |
| 6,063,333 A | 5/2000 | Dennis |
| 6,123,612 A | 9/2000 | Goers |
| 6,126,741 A | 10/2000 | Jones et al. |
| 6,202,770 B1 | 3/2001 | Jurewicz et al. |
| 6,248,447 B1 | 6/2001 | Griffin et al. |
| 6,269,894 B1 | 8/2001 | Griffin |
| 6,298,930 B1 | 10/2001 | Sinor et al. |
| 6,344,149 B1 | 2/2002 | Oles |
| 6,401,845 B1 | 6/2002 | Fielder |
| 6,443,248 B2 | 9/2002 | Yong et al. |
| 6,443,249 B2 | 9/2002 | Beuershausen et al. |
| 6,460,631 B2 | 10/2002 | Dykstra et al. |
| 6,544,308 B2 | 4/2003 | Griffin et al. |
| 6,562,462 B2 | 5/2003 | Griffin et al. |
| 6,582,513 B1 | 6/2003 | Linares et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,681,098 B2 | 1/2004 | Pfenninger et al. |
| 6,739,214 B2 | 5/2004 | Griffin et al. |
| 6,749,033 B2 | 6/2004 | Griffin et al. |
| 6,797,326 B2 | 9/2004 | Griffin et al. |
| 6,811,610 B2 | 11/2004 | Frushour et al. |
| 6,846,341 B2 | 1/2005 | Middlemiss |
| 6,852,414 B1 | 2/2005 | Frushour |
| 6,861,137 B2 | 3/2005 | Griffin et al. |
| 6,878,447 B2 | 4/2005 | Griffin et al. |
| 7,000,715 B2 | 2/2006 | Sinor et al. |
| 7,070,635 B2 | 7/2006 | Frushour |
| 7,316,279 B2 | 1/2008 | Wiseman et al. |
| 7,517,588 B2 | 4/2009 | Frushour |
| 7,595,110 B2 | 9/2009 | Frushour |
| 7,757,791 B2 | 7/2010 | Belnap et al. |
| 2005/0115744 A1 | 6/2005 | Griffin et al. |
| 2006/0081402 A1 * | 4/2006 | Lockwood et al. ........... 175/374 |
| 2008/0115421 A1 | 5/2008 | Sani |
| 2008/0223623 A1 | 9/2008 | Keshavan et al. |
| 2009/0152018 A1 | 6/2009 | Sani |
| 2010/0032006 A1 | 2/2010 | Basol |
| 2011/0083908 A1 | 4/2011 | Shen et al. |

FOREIGN PATENT DOCUMENTS

| | | |
|---|---|---|
| EP | 0329954 A2 | 8/1989 |
| EP | 0462091 A1 | 12/1991 |
| EP | 0462955 A1 | 12/1991 |
| EP | 0480895 A2 | 4/1992 |
| EP | 0500253 A1 | 8/1992 |
| EP | 0595630 A1 | 5/1994 |
| EP | 0595631 A1 | 5/1994 |
| EP | 0612868 A1 | 8/1994 |
| EP | 0617207 A2 | 9/1994 |
| EP | 0671482 A1 | 9/1995 |
| EP | 0787820 A2 | 8/1997 |
| EP | 0860515 A1 | 8/1998 |
| EP | 1190791 A2 | 3/2002 |
| EP | 2048927 A2 | 4/2009 |
| GB | 2048927 A | 12/1980 |
| GB | 2261894 A | 6/1993 |
| GB | 2268768 A | 1/1994 |
| GB | 2323110 A | 9/1998 |
| GB | 2323398 A | 9/1998 |
| JP | 59219500 A | 12/1984 |
| WO | 9323204 A1 | 11/1993 |
| WO | 9634131 A1 | 10/1996 |
| WO | 0028106 A1 | 5/2000 |
| WO | 2004022821 A1 | 3/2004 |

* cited by examiner

METHOD FOR MAKING LOW STRESS PDC

CROSS REFERENCE TO CO-PENDING APPLICATION

This application claims priority benefit of the U.S. Provisional Application Ser. No. 61/480,069 filed on Apr. 28, 2011 in the name of R. Frushour, the entire contents which are incorporated herein by reference.

BACKGROUND

1. Field of the Invention

The present invention relates to a sintered polycrystalline diamond composite for use in rock drilling, machining of wear resistant materials, and other operations which require the high abrasion resistance or wear resistance of a diamond surface. Specifically, this invention relates to such bodies that include a polycrystalline diamond layer attached to a cemented carbide substrate via processing at ultrahigh pressures and temperatures.

2. Description of the Art

It is well known in the art to form a polycrystalline diamond cutting element by sintering diamond particles into a compact using a high pressure, high temperature (HP/HT) press and a suitable catalyst sintering aid. Apparatus and techniques to accomplish the necessary sintering of the diamond particles are disclosed in U.S. Pat. No. 2,941,248 to Hall and U.S. Pat. No. 3,141,746 to DeLai. U.S. Pat. No. 3,745,623 Wentorf et al. teaches sintering of the diamond mass in conjunction with tungsten carbide to produce a composite compact (PDC) in which the diamond particles are bonded directly to each other and to a cemented carbide substrate.

To improve the abrasion characteristics of these cutters, very fine particle size diamond is used to make the sintered diamond body. Use of finer particle size diamond requires the use of higher pressures in order to obtain optimal sintering. The use of these higher pressures introduces higher internal stress into the finished PDC cutting element which has a negative affect on the impact resistance. One measurement of this internal stress is determined in the laboratory by a drop test well known in the art and is performed at room temperature. Room temperature impact resistance is not necessarily an accurate measure of how a PDC cutter will perform in the field. However, PDC's made at these higher pressures do often shatter or delaminate during bit manufacture or use. Brazing operations during bit assembly and high temperatures reached while drilling weaken the cutter as a result of the thermal expansion of the metal catalyst within the pore structure of the sintered diamond body overcoming the strength of the diamond to diamond bonds. Another factor for PDC is the strength of the bond between the diamond table and the substrate. When quenched from HPHT conditions to room pressure and temperature the substrate, with its a much higher thermal expansion coefficient than the diamond, places the diamond table into very high compression. In order to relieve the stress induced by this compressive force the PDC fractures or delaminates.

A method is needed to manufacture PDC cutting elements at higher pressures to improve the abrasion resistance without sacrificing the impact resistance due to high internal stress.

SUMMARY

A method of forming diamond bonds in a diamond material mass in a reaction cell using a sintering aid. In one aspect, the diamond mass is subjected to high pressure and high temperature where an initial pressure is used to compact the mass, the pressure is then lowered to a second pressure prior to the application of heat to the reaction cell. In this aspect, the initial pressure is at least 10% higher or at least 20% higher than the second pressure used during sintering of the diamond mass.

The diamond in the diamond mass is bonded to diamond and/or to a substrate.

In another aspect, a method of forming diamond bonds in a diamond mass in a reaction cell using a sintering aid by subjecting a mass to high pressure and high temperature comprises using an initial pressure to compact the diamond mass, followed by raising the temperature to melt the sintering aid, and then lowering the initial pressure to a second pressure prior to lowering the temperature below the melting point of the sintering aid.

In this aspect, the initial pressure is at least 10% or at least 20% higher than the second pressure. Also in this aspect, the diamond in the diamond material mass is bonded to diamond and/or to a substrate.

BRIEF DESCRIPTION OF THE DRAWING

The various features, advantages and other uses of the present method for making low stress PDC will become more apparent by referring to the following detailed description and drawing in which.

DETAILED DESCRIPTION

Figure 1:
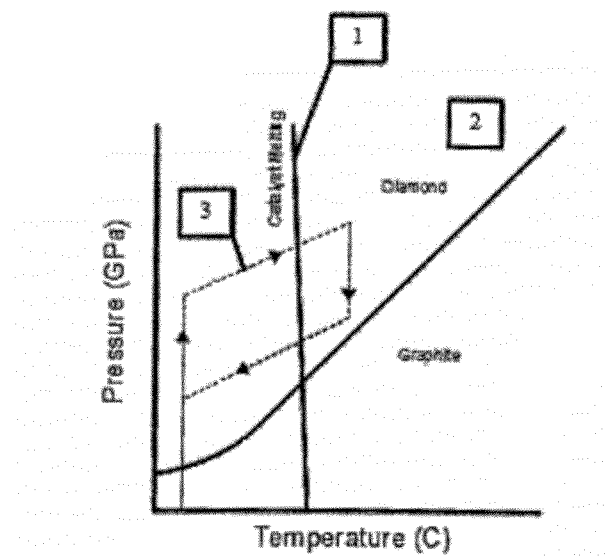
FIG. 1 is a diamond and graphite phase diagram using the pressure temperature processing conditions according to the inventive method.
Figure 2:
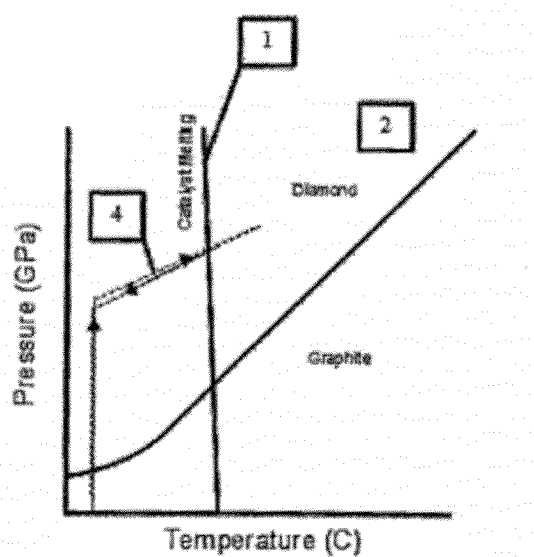
FIG. 2 is a diamond and graphite phase diagram using a conventional method to raise and lower pressure and temperature in a HPHT cell.

The operating conditions can be modified during HPHT manufacturing such that higher pressures can be used to sinter the diamond body without introducing excessive internal stress by modifying the pressure and heat cycle. Improved abrasion due to better diamond to diamond bonding at higher pressures can be achieved by compacting the diamond mass within the high pressure cell to much higher initial pressures than conventionally used, then reducing the pressure to a second pressure which is approximately that normally used prior to raising the temperature to melt the catalyst sintering aid. For example, the initial pressure can be at least 10% higher or at least 20% higher than the second pressure.

Using this method, the diamond in the diamond material mass or diamond body is bonded to diamond. The diamond in the diamond material mass or body is also bonded to a substrate which can be, for example, a cobalt cemented tongue stunned carbide substrate.

Alternately, the diamond mass can be sintered and bonded to the substrate at significantly higher initial pressure and temperature followed by reducing the pressure while the catalyst is still molten. After the pressure is lowered to a second pressure which is about that normally used to make a conventional PDC, the power to the HPHT cell is lowered to reduce the temperature below the melting point of the catalyst metal.

EXAMPLE

A PDC is fabricated at HPHT using a HPHT cell containing a typical cobalt cemented tungsten carbide substrate placed into a molybdenum cup loaded with a mass of diamond crystals. The cell is brought to a pressure of 70 K bars followed by raising temperature to about 1500° C. After 6 minutes, the pressure within the cell is reduced to 52 K bars while reducing the temperature to about 1350° C. The second pressure and temperature conditions are held for 30 seconds, then the temperature of the sample is quenched followed by dropping the pressure to atmospheric pressure.

What is claimed is:

1. A method of forming diamond bonds in a diamond material mass in a reaction cell using a sintering aid by subjecting the mass to high pressure and high temperature comprising:
   using an initial pressure to compact the mass; and
   then lowering the initial pressure to a second pressure prior to applying heat to the reaction cell.

2. The method of claim 1 wherein the initial pressure is at least 10 percent higher than the second pressure used during sintering of the diamond mass.

3. The method of claim 1 wherein the initial pressure is at least 20 percent higher than the second pressure used during sintering of the diamond mass.

4. The method of claim 1 wherein the diamond in the diamond mass is bonded to diamond.

5. The method of claim 1 wherein diamond in the diamond mass is bonded to a substrate.

6. The method of claim 4 wherein the substrate is cobalt cemented tungsten carbide.

7. A method of forming diamond bonds in a diamond material mass in a reaction cell using a sintering aid by subjecting the mass to high pressure and high temperature comprising:
   using an initial pressure to compact the diamond mass:
   followed by raising the temperature to melt the sintering aid; and
   then lowering the initial pressure to a second pressure prior to lowering the temperature below the melting point of the sintering aid.

8. The method of claim 5 wherein the initial pressure is at least 10 percent higher than the second pressure used during sintering of the diamond material mass.

9. The method of claim 7 wherein the initial pressure is at least 20 percent higher than the second pressure used during sintering of the diamond material mass.

10. The method of claim 7 wherein the diamond in the diamond material mass is bonded to diamond.

11. The method of claim 7 wherein diamond in the diamond material mass is bonded to a substrate.

12. The method of claim 11 wherein the substrate is cobalt cemented tungsten carbide.

* * * * *